Jan. 29, 1946.    F. C. LORNITZO    2,393,697
PRESSING HEADS FOR PRESSING MACHINES AND
METHOD OF THEIR MANUFACTURE
Filed Aug. 1, 1941    5 Sheets-Sheet 1

INVENTOR
FRANK C. LORNITZO
BY
ATTORNEY

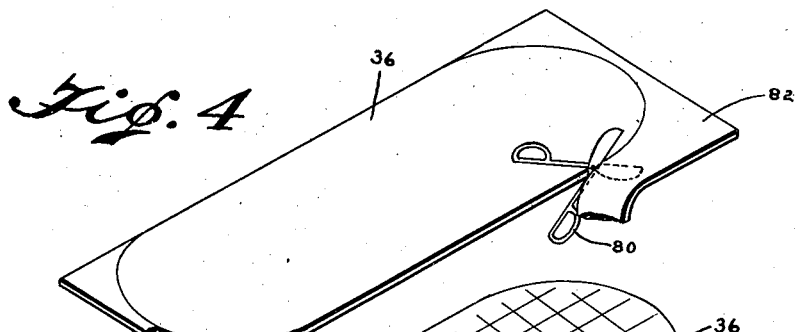
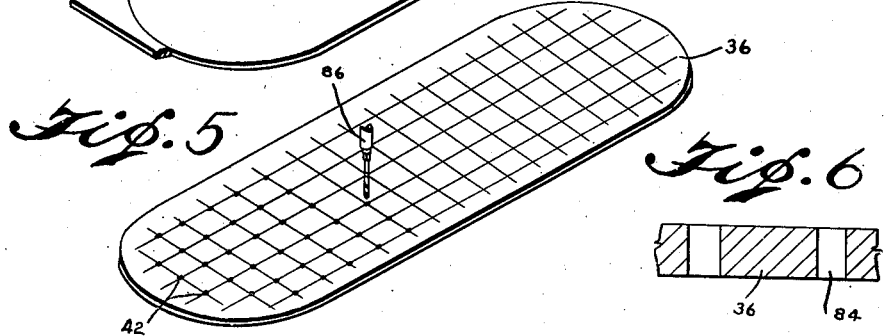
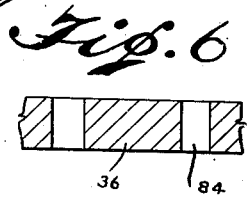
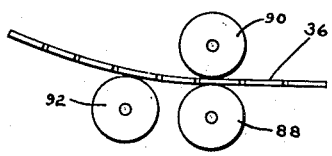
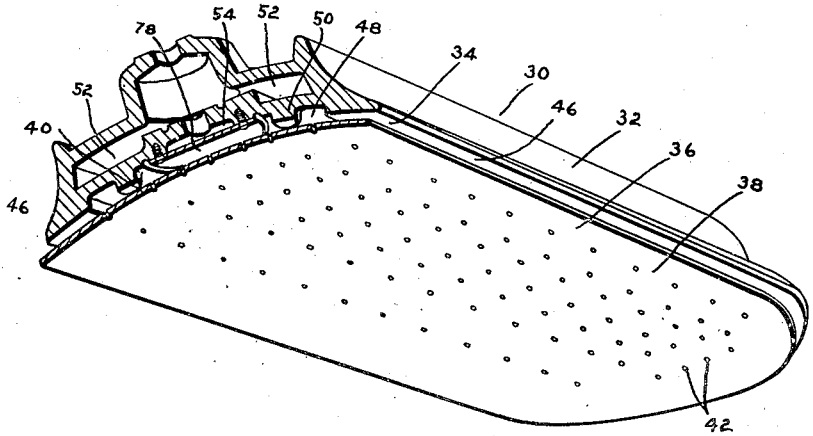

Jan. 29, 1946.
F. C. LORNITZO
2,393,697
PRESSING HEADS FOR PRESSING MACHINES AND
METHOD OF THEIR MANUFACTURE
Filed Aug. 1, 1941
5 Sheets-Sheet 3
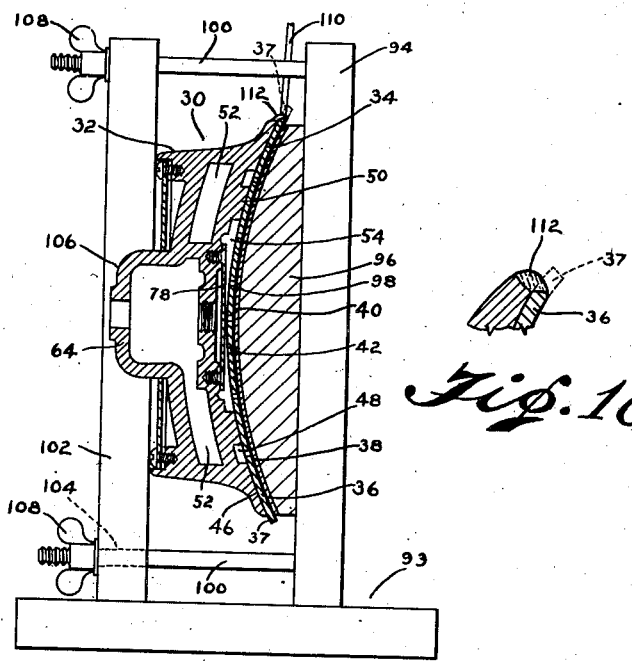
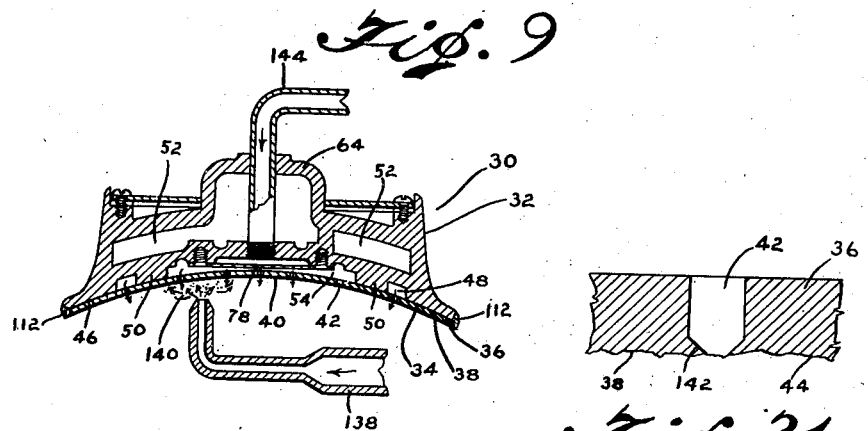
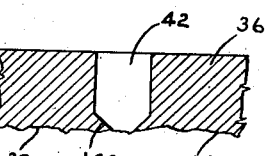
INVENTOR
FRANK C. LORNITZO
BY
ATTORNEY Jan. 29, 1946.　　　F. C. LORNITZO　　　2,393,697
PRESSING HEADS FOR PRESSING MACHINES AND
METHOD OF THEIR MANUFACTURE
Filed Aug. 1, 1941　　　5 Sheets-Sheet 4

INVENTOR
FRANK C. LORNITZO
BY
ATTORNEY

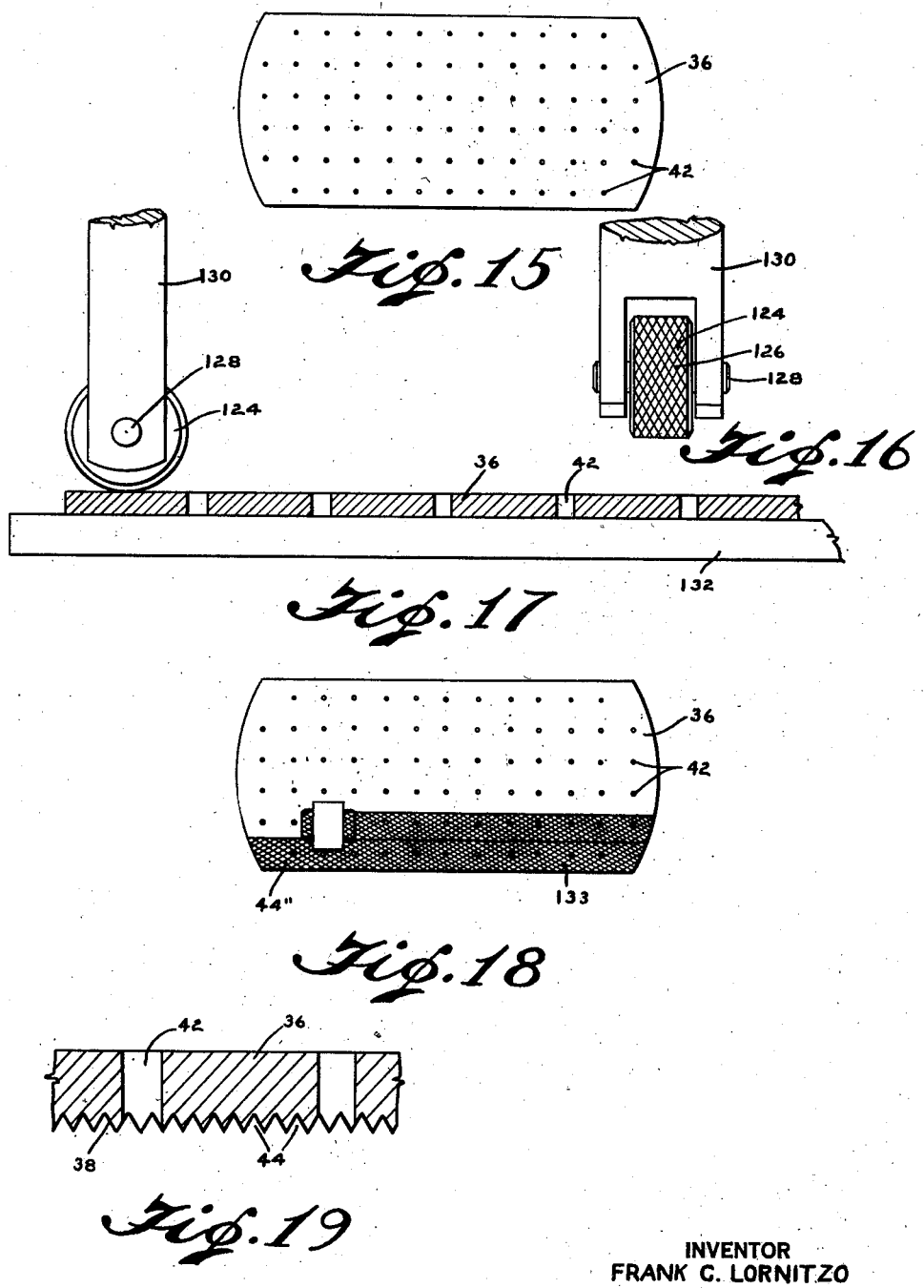

Patented Jan. 29, 1946

2,393,697

UNITED STATES PATENT OFFICE 2,393,697

PRESSING HEAD FOR PRESSING MACHINES AND METHOD OF ITS MANUFACTURE

Frank C. Lornitzo, Pawtucket, R. I., assignor to Pantex Pressing Machine, Inc., Central Falls, R. I., a corporation of Rhode Island Application August 1, 1941, Serial No. 405,008

11 Claims. (Cl. 38—66)

My invention relates to improvements in pressing heads for garment pressing machines, and improvements in their method of manufacture.

An object of my invention is to provide a light strong pressing head in which the body portion and pressing plate are welded together to form a substantially integral unit.

While I am aware that one piece pressing heads have heretofore been made, they have been extremely difficult to manufacture and due to an inherent difficulty in the manufacture thereof, it has been impossible to add desirable characteristics to such cast one-piece pressing heads. While the desirability of providing a substantially one-piece pressing head has been recognized in the prior art and the desirability of initially manufacturing such a pressing head in two pieces, namely, a body portion and a pressing plate so that the desirable refinements in structure may be present in the complete pressing head has also been known, so far as I am aware no one in the prior art has been able to weld a relatively thin pressing plate to a body portion of much larger volume and a main feature of my invention relates to the selection of the materials of the body portion and pressing plate to make such welding possible.

I thus preferably cast the metal body portion, preferably from a light metal such as aluminum or alloys thereof, magnesium, etc., and in order that the relatively thin pressing plate may be welded thereto, I preferably construct the pressing plate of a weldable metal or alloy of higher M. P. than the weldable metal or alloy of the body portion so that as the welding heat is applied to the contacting edges of the pressing plate and body portion, the contacting edges only of the pressing plate will melt only sufficiently to provide material for the weld. It is obvious that if the body portion and pressing plate were constructed of metals having approximately the same M. P. (melting point), due to the fact that the pressing plate is of much smaller volume, the welding heat will be conducted to the pressing plate to cause its pressing surface to be partially melted, thereby making such welding impossible.

It has been customary in the prior art to provide a pressing plate and secure it to the body portion by means of screws, often interposing a gasket or other sealing material, such as hardening paste between the plate and body portion. This structure often has provided breakable gaskets and leaky joints, which are positively eliminated by my improved structure. It is obvious that in use the heat is first applied to the heating chamber in the body portion, thereby initially heating the body portion, tending to cause the body portion to expand in a greater ratio than the plate with consequent wear and tear on the prior art screws, joints and gaskets. It is obvious that with the welded structure the continuous joint between the plate and the body is so strong that these relative differences in ratios of expansion in use will positively not have any such deleterious effects on the pressing head. I have also found in practice that I am able to provide a succession of pressing heads with less variation in weight than is possible in the prior art structures.

An additional advantage of my invention over the prior art one-piece integral structures, is that it is much easier to initially apply the desired structure and finish to a single metal pressing plate than to a pressing surface integral with a body portion, and I am thus enabled to provide a pressing plate having more uniformity in hardness, density, grain and thickness than the prior art structures and also a continuous unbroken pressing surface, not defaced by screw holes, rivets, etc.

As stated, my invention is particularly adapted for use with aluminum alloys, thus providing a relatively lighter pressing head than hitherto thought possible.

A further object of my invention is to provide a pressing plate of more uniform thickness without making allowances for variations in the molding or machining steps formerly necessary.

A further feature of my invention is to provide a pressing plate which may be provided with a greater multiplicity of smaller perforations than hitherto thought possible. When an integral pressing head has been cast in the prior art, it has often only been possible to provide a steam spray chamber of small volume and it has been necessary to drill holes to such a chamber, where due to this inherent feature of construction of the presser head, only a small number of holes to this thus restricted area have been possible. For this reason, it has been necessary to make the relatively small number of holes quite large in diameter so as to pass sufficient steam to the garments being pressed. With a large number of holes of smaller diameter it is apparent that not only greater desirable distribution is effected, but that less steam pressure is required to get the desired results and the combined area of the smaller holes is greater than the combined area of the larger holes formerly only possible to employ.

A further feature of my improved pressing head is to improve the heat conductivity thereof. In my improved device the lower surface of the body portion is provided with an inset spray chamber forming portion, which for heat conducting purposes is preferably provided with a plurality of bosses projecting downwardly therefrom. Inasmuch as prior to welding, I preferably bow or transversely arch the pressing plate with a smaller radius than that of the transversely arched lower surface of the body portion, it is apparent that contact between the upper surface of the pressing plate and the lower ends of the bosses is insured to increase the heat conductivity of the pressing plate, the heat being transmitted from the steam chamber normally located in the body above the steam spray chamber through the intervening wall and bosses to said pressing plate. In the prior art it has been impossible to cast an integral structure having these desirable bosses.

With my improved structure, it is also apparent that it is easy to lay out a multiplicity of small perforations in the pressing plate to positively insure that they will discharge within the open portions of the spray chamber intermediate said bosses. With the large drilled holes in the prior art it has been found that the stream spray has often left marks on the garments being pressed which marks are eliminated with the distribution of steam through the multiplicity of smaller perforations possible with my improved pressing head.

A great difficulty in the cast pressing heads of the prior art has been to provide a steam spray chamber of sufficient area due to the difficulty of removing the molding sand therefrom, which difficulty has been enhanced if any attempt has been made to cast bosses to project within said steam spray chamber. A further object of my invention is to provide a structure wherein the necessity of removing molding sand out of a cast interior chamber is eliminated.

A further object of my invention is to facilitate the hole drilling operation, as it is obvious that a greater multiplicity of holes can be more easily drilled in a relatively small thin plate than through a thicker surface of a casting, this being particularly true if it has a lower pressing surface transversely arched.

The desirability of providing a lower pressing surface which will not flatten the nap of the garments being pressed as a smooth surface will tend to do has long been recognized. It has been suggested that the lower pressing surface of an integral pressing head be suitably roughened, which operation has been very hard to do in a heavy casting. It has also been suggested to attach a supplemental rough surface to the lower surface of the pressing head and for this pressing surface, detachable wire grids or cloths have often been employed to prevent the nap from being laid down and the garment made shiny. While screen grids have also been used for this purpose, it is apparent that interposing a separate surface for this purpose has decreased the heating efficiency of the pressing machine due to the necessity of interposing a supplemental member usually at a slightly spaced distance between the garment being pressed and the pressing surface, which supplemental surface has often in the case of cloth, been not readily heat conductive.

A further object of my invention is to provide a structure wherein the lower surface of the pressing plate may be readily roughened in one of several manners and in which the interposition of a separate rough surface between the pressing surface and the garment to be pressed is eliminated. I have discovered that the manipulation of the pressing plate to effect the roughening of the pressing surface thereof may be readily accomplished in several manners if it is so roughened prior to being attached. Thus prior to being welded to the body portion, the lower surface of the pressing plate may be, (1) readily corrugated, (2) readily sandblasted or (3) readily provided with wire screening impressions thereon. In the prior art for certain laundry purposes, it has been thought necessary to employ two types of pressing heads, one having a smooth pressing surface where a high heat has been believed requisite for light or fine goods and the other a pressing head having a roughened lower surface for the purpose of preventing permanent laying of the nap in heavy garments in the manner hitherto described. Due to the improved heat conductivity of my improved pressing head with a rough lower surface, I have discovered that my improved pressing head may be used for all such purposes with enough heat being supplied to the rough pressing surface thereof to readily iron light or fine goods. In other words, I have provided a single pressing head suitable for supplying sufficient heat for all uses, thereby eliminating the necessity for two types of pressing heads thought necessary in the prior art.

Employing my invention, it is also possible to change from a pressing head having a smooth pressing surface to one having a rough pressing surface by merely sandblasting the pressing surface thereof in the manner described in the claims herein.

Further objects of my invention are to provide improvements in the composite method preferably employed by me in making my improved pressing head and improvements in the various component steps thereof and the articles produced thereby.

These and such other objects of my invention as may hereinafter appear will be best understood from a description of the accompanying drawings which illustrate various embodiments thereof.

In the drawings,

Fig. 4 is a perspective view illustrating the step of cutting a pressing plate from a relatively thin sheet of metal of higher M. P. than the cast metal pressing head body portion, preferably of slightly greater area than the lower surface of said body portion.

Fig. 5 is a perspective view illustrating the step of drilling a multiplicity of holes in the so cut pressing plate.

Fig. 6 is a detailed sectional view illustrating a plurality of such holes in said pressing plate.

Fig. 7 is an end elevation illustrating the step of transversely arching the pressing plate with a smaller radius than that of the lower surface of the body portion by a plurality of pressing rolls.

Fig. 8 is a disassembled perspective view showing the preformed and preperforated pressing plate in the act of being brought into welding juxtaposition with the lower surface of the body portion.

Fig. 9 is a sectional view through a suitable clamp for holding the pressing plate firmly against the lower surface of said body portion while the contacting edges of said body portion and plate are being welded by melting the projecting edges of said plate to weld the edges of said plate to the edges of the lower surface of the body portion, showing certain edges of said plate and body member welded by a suitable welding device and other edges thereof prior to being welded.

Fig. 10 is an enlarged detailed sectional view showing how the projecting edge of the plate (shown in dotted lines) is melted to form the weld, as shown in full lines.

Figure 11:
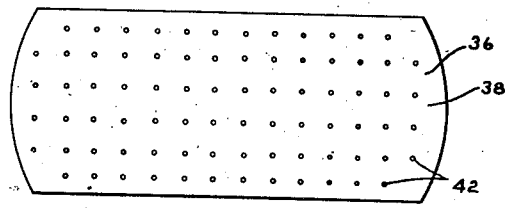
Figure 12:
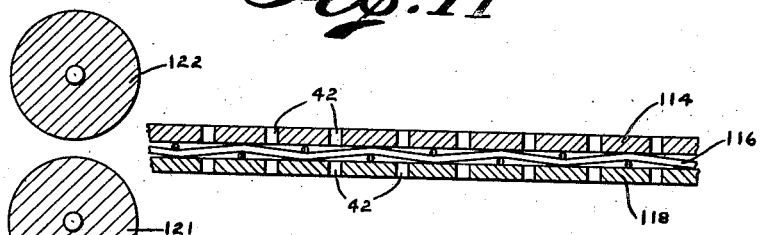
Figure 13:
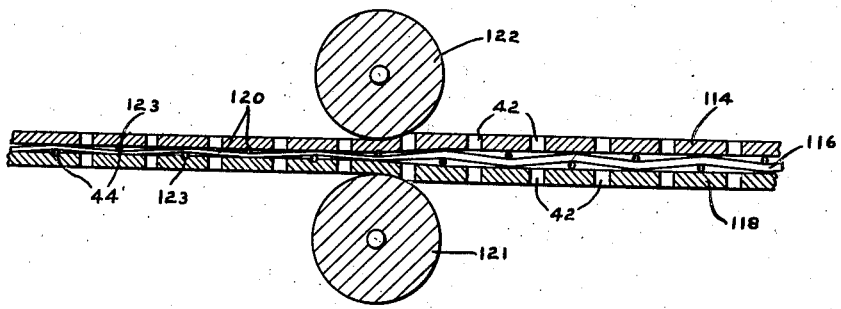
Figure 14:
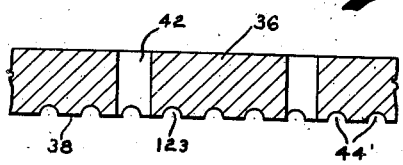

Figs. 11-14 illustrate a method for roughening the lower surface of the pressing plate, Fig. 11 being a plan view of the perforated pressing plate, Fig. 12 being a sectional view showing three layers comprising an upper and lower layer, one of which comprises the preformed pressing plate shown in Fig. 11 and the other of which comprises another such plate of similar shape having a layer of wire screening interposed between them about to be inserted between compressing rolls, Fig. 13 being a sectional view similar to Fig. 12 showing how said layers are compressed after passing between said rolls to form screening impressions on the adjacent surfaces of said upper and lower layers and Fig. 14 being a detailed sectional view illustrating such a roughened surface on a pressing plate roughened with screening impressions on the lower pressing surface thereof.

Figs. 15-19 illustrate an alternative method I may employ for roughening the lower surface of the pressing plate by corrugating it with a suitable corrugating tool, Fig. 15 being a plan view of a perforated pressing plate, Fig. 16 being a front elevation of a suitable corrugating tool, Fig. 17 being a side elevation illustrating said tool in the act of corrugating the pressing plate while held on a suitable form, in this instance prior to arching said plate, Fig. 18 being a plan view illustrating the corrugating tool in the act of corrugating said surface and Fig. 19 being a detailed sectional view through such a perforated corrugated pressing plate.

Fig. 20 is a detailed sectional view taken through an assembled pressing head illustrating an alternative method of roughening the lower surface of the pressing plate, in this instance after it has been assembled by sandblasting it with a suitable device and at the same time discharging fluid outwardly through the perforations in said plate from the interior of the hollow pressing head with such force as to permit a partial constriction but prevent a total obstruction of the lower ends of the perforations.

Fig. 21 is a detailed sectional view of such a perforated sandblasted pressing plate showing a partially constricted perforation therein.

In the drawings, wherein like characters of reference indicate like parts throughout, 30 generally indicates a hollow pressing head for garment pressing machines constructed in accordance with my invention. Said pressing head comprises a hollow body portion 32 having the transversely arched lower surface 34 and a relatively thin pressing plate 36 constructed of metal of a higher M. P. having a lower surface 38 preferably transversely arched as at 40 and preferably having a multiplicity of preformed perforations 42 therein, and preferably roughened as at 44, having the edges thereof welded to the edges of the lower surface of said body portion.

Figure 1:
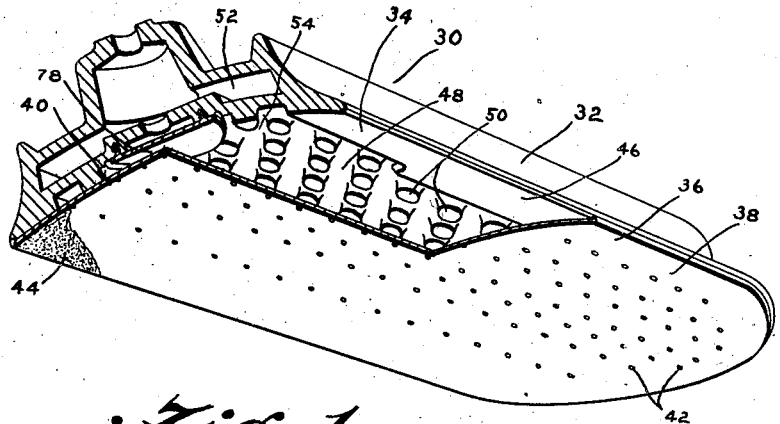
Fig. 1 is a perspective view of a portion of a pressing head constructed in accordance with my invention having a portion of the pressing plate thereof broken away and illustrating for purposes of clarity of the remainder of the drawings one portion only thereof roughened.

The lower roughened surface of the pressing plate 38 may comprise (a) a sandblasted surface as shown at 44 in Fig. 1 to provide a closely pitted surface, (b) a surface roughened by having wire screening impressions therein as shown at 44' in Fig. 14 or (c) a surface roughened by having corrugations 44'' therein as shown in Fig. 18. While I preferably employ a pressing head 30 having a roughened lower pressing surface 38, it is obvious that for certain types of work said lower surface may be left smooth if desired.

Figure 3:
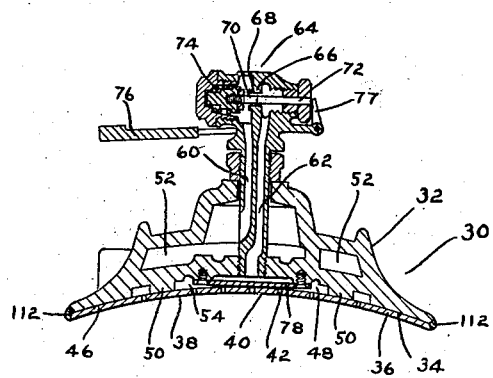
Fig. 3 is a vertical sectional view similar to Fig. 1 with the steam spray valve in a position to admit steam to the steam spray chamber.
Figure 2:
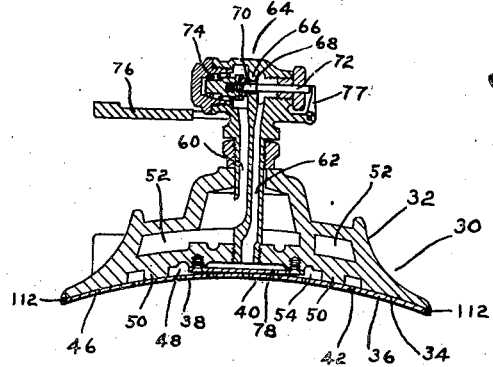
Fig. 2 is a vertical sectional view taken centrally thereof through the steam spray valve with the valve in a closed position preventing passage of the steam from the steam heating chamber to the steam spray chamber.

While certain features of my invention may be incorporated into any type of pressing head, as shown in Figs. 1-3 the metal body portion 32 preferably has a lower wall comprising a thin marginal portion 46 extending continuously around the edges thereof and an inset steam spray chamber forming portion 48 interior of said marginal portion 46, said inset portion having a multiplicity of bosses 50 projecting at spaced distances downwardly throughout the area thereof. Said body portion 32 is also provided with an upper steam heating chamber 52 above said steam spray chamber forming portion 48. The relatively thin pressing plate 36 of a metal of higher M. P. is provided with a multiplicity of preformed perforations 42 therein spaced at predetermined intervals throughout the area thereof and has the edges thereof welded to the edges of said marginal portion 46 so that said bosses 50 contact said plate 36 to conduct heat thereto, said device being designed so that the perforations 42 are located intermediate said bosses. It is thus obvious that the pressing plate 36 forms the lower wall of the steam spray chamber 54, the upper surface of the inset portion 48 forming the top wall thereof and the inner ends of the marginal portions 46 forming the side and end walls thereof. The pressing head 30 is provided with the usual attachment 64 projecting upwardly from the center thereof for discharging steam from the steam heating chamber 52 outwardly through the perforations 42 through the steam spray chamber 54. Said attachment has the adjustable valve 70 in the upper end thereof and has the passage 60 leading from the steam heating chamber 52 to said upper end and a passage 62 leading downwardly from said upper end to the spray discharge chamber 54, said passages being separated from each other at the upper end thereof by the wall 66 having the orifice 68 therein forming a valve seat. The valve 70 has the valve stem 72 projecting outwardly from a side of the upper end of said attachment 64 and comprises a valve forming enlargement 70 normally urged by the spring 74 to a position closing said orifice 68. A handle 76 is pivotally mounted on the frame having an arm 77 adapted on depression of the handle 76 to push the valve stem 72 inwardly against the force of the spring 74 to move the valve enlargement 70 free of the orifice 68 to permit steam from the steam heating chamber 52 to pass upwardly through the duct 60, orifice 68 and downwardly through the duct 62 to the steam spray chamber 54, being dispersed by a baffle 78 mounted in said spray chamber 54 underneath said passage 62 to be distributed evenly throughout the area of said steam spray chamber 54 and to be discharged downwardly through said perforations 42 on to the garments being pressed as desired on depression of the handle 76.

It is apparent that this construction overcomes many obstacles in the manufacture and functioning of prior art pressing heads. By employing a multiplicity of bosses 50 and insuring that the upper surface of the pressing plate 36 is in contact therewith, a high degree of conductivity from the steam chamber 52 is provided, so great in fact, that sufficient heat may be conducted to the pressing plate for all purposes, making it possible to employ a roughened surface 44 as the pressing surface of said pressing plate, whether the pressing plate is to be used for pressing heavy garments, fancy goods, silks, or other fine laundry work. A structure is also provided wherein it is easy to so design the perforations 42 and to distribute them over such a large area of the pressing surface that a relatively smaller steam pressure may be employed than formerly. Employing this construction, as there is no difficulty in removing molding sand from interior chambers of integral castings, the steam spray chamber may be made of much larger area than formerly and the pressing plate provided with a larger number of perforations discharging intermediate said bosses. My invention also makes possible the use of a continuously welded joint securing the edges of the pressing plate to the edges of the lower surface of the body portion, thereby eliminating leakage formerly present when bolts were used for joining the edges of pressing plates to body portions, the blowing out of gaskets and providing a sufficiently tight joint which will not yield on differences in heat expansion between said body portion and plate. In addition, I have provided a structure wherein the lower pressing surface 38 may be readily roughened in any suitable manner.

While the desirability of welding a relatively thin pressing plate to a body portion of a pressing head has long been desired, no way has been known hitherto of accomplishing this result without at least partially burning up or deleteriously affecting the exposed lower surface of the pressing plate. If the pressing plate has been made of metal of the same M. P. (melting point) as that of the body portion, being of smaller volume than that of said body portion, when a welding heat is applied to the edges thereof, it has tended to melt away a large portion of the pressing plate. In the specification and claims I employ the abbreviation M. P. to signify "melting point." I have discovered that such a welding becomes possible if the metal of which the pressing plate is constructed be generally similar to that of, but having a higher M. P. than the metal of the body portion so that the differences in volume of metal between said portions may be compensated for by this difference in M. P. to cause the edges only of the pressing plate to melt to weld the edges of the pressing plate to the edges of the lower surface of the body portion. It is apparent that my judicious selection of materials makes this desirable welding feature commercially possible. While any suitable metals may be employed for the body portion and for the pressing plate, it is desirable that the pressing plate be as light as possible and I therefore preferably construct the body portion of aluminum alloy and the pressing plate itself of aluminum or an aluminum alloy having a higher M. P. As stated, in place of aluminum or suitable aluminum alloy, magnesium or suitable magnesium alloy may be employed both in the body portion and pressing plate.

My invention therefore also includes improvements in the method of making such a pressing head. For this purpose the hollow metal pressing head body portion 32 may be suitably cast, or otherwise formed in any suitable manner being preferably provided with a transversely arched lower surface of known radius. The pressing plate 36 may also be suitably formed in any desired manner, such as shown in Fig. 4 by cutting it out by means of the shears 80 or in any other suitable manner from the relatively thin sheet 82 of metal of higher M. P. than that of the body 32. The pressing plate is preferably formed of slightly greater area than the lower surface 34 of said body portion, although it is still possible to weld it to the lower surface 34 of said body portion if the pressing plate 36 be substantially of the same area. A large multiplicity of aligned holes 42 may then be formed in said plate in any suitable manner, such as by the drill 86. The pressing plate 36 may then be transversely arched in any suitable manner, such as is shown in Fig. 7, by passing it between a plurality of suitably spaced rolls, in the embodiment shown, comprising the lower roll 88, the upper roll 90 adjustable relative thereto for thickness of the pressing plate 36 and the bending roll 92 also vertically adjustable to vary the curvature imparted to the plate 36. If the pressing plate 36 be arched along a smaller radius than that of the lower surface 34 of the body portion 32, it is obvious that when welded thereto in use it will tend at all times to contact the lower ends of the bosses 50 to provide continuous heat conductivity conduit means to said plate.

I then bring said plate 36 into welding juxtaposition to the lower surface 34 of said body portion 32. Fig. 8 illustrates the pressing plate in the act of being brought adjacent to said lower surface 34. Where the lower surface 38 of said pressing plate has been roughened in any of the manners to be explained, said plate 36 is brought into welding juxtaposition to the lower surface 34 of said body portion 32 with the roughened lower surface thereof lowermost.

Fig. 9 illustrates a suitable welding clamp 93 comprising the base 94 having the convex seat 96 adapted to receive the concave lower surface 38 of the pressing plate thereon with a suitable insulating sheet 98 of asbestos, or other insulating material interposed between them and having the bolts 100 projecting laterally therefrom and the adjustment clamping plate 102 having suitable bolt holes 104 therein and a suitable depression 105 for receiving the valve portion 64 of said pressing head therein. In actual practice two sets of clamping fixtures 93 are employed, one on each side of the central valve extension 64 of the body member, the depression 106 therefor being theoretically formed between each of said clamping fixtures. The ends of the bolts 100 are threaded and are provided with suitable wing nuts 108 for adjustably clamping the adjustable clamping plates 102 towards the clamping fixed plates 94 for urging the body portion 32 into close juxtaposition with the pressing plate 36 lying on its retaining base 96, which extends longitudinally of both fixtures 93. As shown at the lower portion of the area of contact between the outer edge of the pressing plate and the outer edge of the marginal portion of the lower surface of the body portion, as the pressing plate is of slightly greater area than that of the lower surface 34 of the body portion it will project as shown at 37 continuously around the periphery of said contacting edges. I have illustrated a suitable welding tool 110 heated in any suitable manner to a suitable welding heat brought adjacent the projecting edge 37 along the upper surface of the pressing plate as shown in dotted lines therein, said projecting edge 37 melting without deleteriously affecting the lower exposed pressing surface of said pressing plate 36 to form the melted weld 112 continuously rigidly joining the edges of the pressing plate and of the marginal portion 46 on the lower surface 34 of the body portion 32 around the peripheries thereof. Any method of welding may be employed, gas welding as well as electrical welding and the tool 110 shown merely diagrammatically illustrates any suitable type of electrode which may be employed for electric welding.

As stated, the lower surface 38 of the pressing plate may be suitably roughened as at 44 before or after welding in any suitable manner or it may if desired be left smooth.

As stated, various types of screening or cloth attachments have been provided in the prior art for superimposing a layer of screening or cloth over the lower pressing surface 38 and one convenient form of roughening as a substitute for and to obviate the necessity of such a separate member comprises the application of wire screening impressions 44' on the lower surface 38 of said pressing plate. I have illustrated in Figs. 11–14 a suitable method of making these wire screening impressions on said lower surface 38. First the pressing plate may be formed of the desired size and with the desired number of perforations as shown in Fig. 11. I then superimpose three layers of material, the top layer 114 of which may comprise a pressing plate 36, the intermediate layer 116 of which may comprise an actual layer of wire screening and the lower layer 118 of which may comprise another pressing plate 36 or any other suitable shape. The three superimposed layers are then passed between the adjustably spaced compressing rollers 121 and 122 to compress said layers as shown in Fig. 13 and with such compression forcing the individual wires 120 of said wire screening 116 into the adjacent surfaces of said layers 114 and 118 to provide the wire screening impressions 123 or roughened indentations 44' in each of said layers. The respective layers 114, 116 and 118 may then be conveniently separated and the pressing plate 36 so roughened welded to its respective body portion in the manner shown in Figs. 8–10.

The lower surface 38 of said pressing plate may be roughened by providing it with the corrugations 44'' and I have illustrated in Figs. 15–19 a suitable method of corrugating it. Fig. 15 illustrates a preperforated and preformed pressing plate 36. Fig. 16 illustrates a suitable corrugating roller 124 provided with the diagonal corrugating lines 126 therein suitably mounted on a stub axle 128 on the lower end of a holder 130. The pressing plate is then laid on a suitable base 132 and the corrugating roller 124 relatively passed over it in any suitable manner, such as in the longitudinal lines 133 shown in Fig. 18 with sufficient downward pressure being exerted on the holder 130 to provide said lower surface 38 with said corrugations 44''.

I have shown in Figs. 20 and 21 an alternative method of roughening the lower surface 38 of the pressing plate comprising sandblasting it. While, if desired, the lower surface of said pressing plate may be suitably sandblasted, or otherwise pitted prior to being welded to the lower surface of the body portion 32, I have discovered that it may be sandblasted in a convenient manner after it has been welded to said body portion. For this purpose, any type of sandblasting tool 138 is brought into position underneath said lower surface 38 and the sand 140, brought under compression by any suitable source of fluid in said tool 138, is violently urged against the lower surface 38 of said pressing plate providing a rough, closely pitted surface 44 as the roughened surface of said pressing plate. I have discovered that it is desirable to keep the lower ends of the perforations 42 open, but that if desired their efficiency may be increased by partially constricting them as shown at 142 in Fig. 21. It is apparent that with a pressing head constructed in the manner hitherto described that it is already provided with a steam spray discharge chamber 54 discharging directly into said perforations 42 and that a suitable pipe 144 may be inserted in the connection 64 to the steam discharge chamber 54, through which fluid may be passed to be discharged into said steam spray chamber 54 and outwardly through the perforations 42 in said plate 36, while the fluid actuated sandblast is being projected upwardly against the lower surface 38 of said pressing plate 36. It is obvious that the velocity of said streams, namely, that of air discharging downwardly through said perforations and that of the sandblast discharging upwardly against said lower surface 38 may be adjustably regulated, preferably by simply controlling the velocity of fluid in said inlet pipe 144 so that said upward stream of fluid will discharge said sand particles 140 against said surface 38 in a manner only constricting the lower ends 142 of said perforations 42, but not totally obstructing them while simultaneously pitting and roughening said pressing surface 38 as at 44''.

While my improved method is primarily designed for the manufacture of pressing heads, it is obvious that various inherent steps thereof are novel and may be individually applied if desired for other purposes in the manufacture of other types of articles.

It is apparent therefore that I have provided a novel type of pressing head with the advantages set forth above.

It is understood that my invention is not limited to the specific embodiments shown or methods described and that various deviations thereof may be made therefrom without departing from the spirit and scope of the appended claims.

What I claim is:

1. A hollow pressing head for pressing machines comprising, a hollow relatively thick light metal or light metal alloy body of the class consisting of magnesium, aluminum and their respective alloys and a relatively thin pressing plate of light metal or alloy of a higher M. P. than the melting point of the metal body of the class consisting of magnesium, aluminum and their respective alloys and having a multiplicity of preformed perforations therein, and a continuous fillet extending entirely along the edge of the pressing plate and body containing metal melted from the edge of the pressing plate fused to the edge of said relatively thick hollow light metal body.

2. A hollow pressing head for pressing machines comprising a hollow relatively thick aluminum alloy body and a relatively thin pressing plate of aluminum or aluminum alloy of a higher M. P. than the M. P. of the aluminum alloy body and having a multiplicity of preformed perforations therein, and a continuous fillet extending entirely along the edge of the pressing plate and body containing metal melted from the edge of the pressing plate fused to the edge of said relatively thick hollow metal body.

3. A hollow pressing head for pressing machines comprising a hollow relatively thick aluminum alloy body and a relatively thin pressing plate of aluminum or aluminum alloy of a higher M. P. than the M. P. of the aluminum alloy body having a rough lower surface and having a multiplicity of preformed perforations therein, and a continuous fillet extending entirely along the edge of the pressing plate and body containing metal melted from the edge of the pressing plate fused to the edge of said relatively thick hollow metal body.

4. A hollow pressing head for pressing machines comprising, a hollow relatively thick aluminum alloy body and a relatively thin pressing plate of aluminum or aluminum alloy of a higher M. P. than the M. P. of the aluminum alloy body having a closely pitted lower surface and having a multiplicity of preformed perforations therein, and a continuous fillet extending entirely along the edge of the pressing plate and body containing metal melted from the edge of the pressing plate fused to the edge of said relatively thick hollow metal body.

5. A hollow pressing head for pressing machines comprising a hollow relatively thick aluminum alloy body and a relatively thin pressing plate of aluminum or aluminum alloy of a higher M. P. than the M. P. of the aluminum alloy body having a corrugated lower surface and having a multiplicity of preformed perforations therein, and a continuous fillet extending entirely along the edge of the pressing plate and body containing metal melted from the edge of the pressing plate fused to the edge of said relatively thick hollow metal body.

6. A hollow pressing head for pressing machines comprising, a hollow relatively thick aluminum alloy body and a relatively thin pressing plate of aluminum or aluminum alloy of a higher M. P. than the M. P. of the aluminum alloy body having a lower surface and having a multiplicity of preformed perforations therein and a continuous fillet extending entirely along the edge of the pressing plate and body containing metal melted from the edge of the pressing plate fused to the edge of said relatively thick hollow metal body, said lower surface having wire screen impressions thereon.

7. The method of making a pressing head, which comprises, casting a hollow light metal alloy pressing head body portion having a transversely arched lower surface, cutting from a relatively thin sheet of light metal or alloy of higher M. P. than the melting point of the metal body, a pressing plate of slightly greater area than the lower surface of said body portion, drilling a multiplicity of holes in said plate, transversely arching said plate with a smaller radius than that of the surface of said body portion, roughening the lower surface of said plate, bringing said plate by itself into welding juxtaposition with the lower surface of said body portion with said roughened surface lowermost and applying a welding heat to the contacting edges of said body portion and plate to melt the projecting edges of said plate to weld the edges of said plate to the edges of the lower surface of said body portion without substantially melting any of the exposed lower surface of said pressing plate underlying said body portion and any of the metal of the body portion and to insure contact of said plate with at least part of the lower surface of said body portion.

8. The method of making a pressing head which comprises, casting a hollow light metal alloy pressing head body portion, forming a relatively thin pressing plate of light metal or alloy of higher M. P. than the melting point of the metal body, drilling a multiplicity of holes in said plate, bringing said plate by itself into welding juxtaposition with the lower surface of said body portion, and applying a welding heat to the contacting edges of said body portion and plate to melt the edges of said plate to weld the edges of said plate to the edges of the lower surface of said body portion without substantially melting any of the exposed lower surface of said pressing plate underlying said body portion and any of the metal of the body portion.

9. The method of making a pressing head, which comprises, casing a hollow light metal alloy pressing head body portion having a transversely arched lower surface, forming a relatively thin pressing plate of light metal or alloy of higher M. P. than the melting point of the metal body, drilling a multiplicity of holes in said plate, transversely arching said plate with a smaller radius than that of the lower surface of said body portion, bringing said plate by itself into welding juxtaposition with the lower surface of said body portion, and applying a welding heat to the contacting edges of said body portion and plate to melt the edges of said plate to weld the edges of said plate to the edges of the lower surface of said body portion without substantially melting any of the exposed lower surface of said pressing plate underlying said body portion and any of the metal of the body portion and to insure contact of said plate with at least part of the lower surface of said body portion.

10. The method of making a pressing head which comprises forming a hollow light metal or light metal alloy pressing head body portion of substantial volume, forming a relatively thin pressing plate of substantially the area of the lower surface of said body and of a light metal or alloy of higher M. P. than said body, forming a multiplicity of minute perforations in said plate, bringing said plate by itself into welding juxtaposition with the lower surface of said body, and applying a welding heat to the contacting edges of said body and plate to melt the edges of said plate to weld the edges of said plate to the edges of said surface of said body without substantially melting away any of the exposed surface of said relatively thin plate overlying said surface of said body and any of the metal of the body.

11. A hollow pressing head for pressing machines comprising, a hollow relatively thick aluminum alloy body and a relatively thin pressing plate of aluminum or aluminum alloy of a higher M. P. than the M. P. of the aluminum alloy body having a closely pitted lower surface and having a multiplicity of preformed perforations therein with the outer ends of said perforations partially constricted, and a continuous fillet extending entirely along the edge of the pressing plate and body containing metal melted from the edge of the pressing plate fused to the edge of said relatively thick hollow metal body.

FRANK C. LORNITZO.